United States Patent Office 3,426,032
Patented Feb. 4, 1969

3,426,032
($R_1$—$R_2$-HYDROXYMETHYL)-($R_3$—$R_4$-HYDROXY-METHYL)-CYCLOPENTADIENES
Richard J. Mohrbacher, Fort Washington, and Chris Royce Rasmussen, Ambler, Pa., assignors to McNeil Laboratories, Incorporated, a corporation of Pennsylvania
No Drawing. Filed Feb. 24, 1966, Ser. No. 529,656
U.S. Cl. 260—296
Int. Cl. C07d 31/20
4 Claims

ABSTRACT OF THE DISCLOSURE

The compounds are of the class of di-substituted cyclopentadienes which are useful as ultra-violet light absorbers.

This invention relates to novel organic compounds and to the preparation thereof. More particularly, this invention relates to $R_1$—$R_2$-hydroxymethyl substituted cyclopentadiene having an $R_3$—$R_4$-hydroxymethyl substituent on a ring carbon atom one removed from the ring carbon atom bearing said $R_1$—$R_2$-hydroxymethyl substituent.

In these disubstituted cyclopentadienes, wherein the respective $R_1$—$R_2$-hydroxymethyl and $R_3$—$R_4$-hydromethyl substituents are attached to ring carbon atoms separated by an unsubstituted ring carbon atom, $R_1$, $R_2$, $R_3$ and $R_4$ are each a member selected from the group consisting of aryl, preferably phenyl; substituted phenyl in which the substituent is one or more of lower alkyl, lower alkoxy, halo, nitro, di-(lower alkyl)-amino or trifluoromethyl; heteroaryl, preferably quinolyl and pyridyl, including 2-pyridyl, 3-pyridyl and 4-pyridyl; and such heteroaryl bearing a lower alkyl substituent; provided that at least one of said $R_1$, $R_2$, $R_3$ and $R_4$ is an electron-withdrawing aryl or heteroaryl group such as, for example, pyridyl, quinolyl and nitrophenyl; and provided further that when $R_1$, $R_2$, $R_3$ and $R_4$ are each a member selected from the group consisting of 2-pyridyl, 3-pyridyl, 4-pyridyl and lower alkyl-pyridyl, at least one of said $R_3$ and $R_4$ is different from said $R_1$ and $R_2$.

As used herein, lower alkyl and lower alkoxy include straight or branched saturated aliphatic chains, such as, for example, methyl, ethyl, propyl, isopropyl, butyl, isobutyl, secondary-butyl, pentyl and the like, and, respectively, methoxy, ethoxy, propoxy, isopropoxy, etc.; and halo includes chloro, bromo, fluoro and iodo.

The subject compounds absorb ultra-violet (U.V.) light and can be employed as effective U.V. screens when incorporated in suitable vehicles such as transparent film-forming compositions and oils.

The subject compounds may be advantageously prepared by reacting an appropriate $R_1$—CO—$R_2$ ketone with a cyclopentadienyl Grignard reagent, e.g., a cyclopentadienyl magnesium halide such as cyclopentadienyl magnesium bromide or chloride in a nonhydroxylic solvent, preferably at reduced temperatures, to produce the corresponding cyclopentadienyl $R_1$—$R_2$-methanol which, in turn may be treated with an appropriate $R_3$—CO—$R_4$ ketone in the presence of a base, such as an alkali metal lower alkoxide, in a lower alkanol solvent. In place of the cyclopentadienyl Grignard reagent, a cyclopentadienyl alkali metal, e.g., cyclopentadienyl lithium or cyclopentadienyl sodium, may be employed. Typical nonhydroxylic solvents are ethers such as diethyl ether, tetrahydrofuran, ethylene glycol dimethyl ether, and the like; aromatic hydrocarbons such as benzene, toluene, xylene and the like; aliphatic hydrocarbons such as hexane, heptane and the like; alicyclic hydrocarbons such as methylcyclohexane; and mixtures of such aromatic, aliphatic and alicyclic hydrocarbons. A catalytic amount of the alkali metal lower alkoxide is generally all that is required, although from 0.01 to 0.1 mole of alkoxide per mole of ketonic reagent is preferred and up to 0.5 mole may be advantageously employed. The preferred alkoxide and lower alkanol are sodium ethoxide and ethanol, respectively. Allowable temperatures for the above reactions may range from —30° C. to +30° C.

Due to the known double bond isomerization of the cyclopentadienyl ring nucleus in substituted cyclopentadienes, it is evident that the existence of the subject compounds as more than one double bond isomer is possible and, accordingly, it is intended that all such isomers be included within the scope of this invention. Thus, the product obtained from the above-described reaction results in a mixture of double-bond isomers of the subject ($R_1$—$R_2$ - hydroxymethyl) - ($R_3$—$R_4$ - hydroxymethyl)-cyclopentadiene which, as evidenced by nuclear magnetic resonance (n.m.r.) spectroscopy, generally comprises 1-($R_1$—$R_2$ - hydroxymethyl) - 4-($R_3$—$R_4$-hydroxymethyl)-cyclopenta - 1,3 - diene and 1-($R_1$—$R_2$-hydroxymethyl)-3-($R_3$—$R_4$-hydroxymethyl)-cyclopenta-1,3-diene, which can generally be separated by conventional techniques such as fractional crystallization.

Among the preferred compounds herein are $R_1$—$R_2$-hydoxymethyl substituted cyclopentadienes having an $R_3$—$R_4$-hydoxymethyl substituent on a ring carbon atom one removed from the ring carbon atom bearing said $R_1$—$R_2$-hydroxymethyl substituent wherein $R_1$, $R_2$, $R_3$ and $R_4$ are each a member selected from the group consisting of phenyl, pyridyl and lower alkyl-pyridyl, provided that at least one of said $R_3$ and $R_4$ is different from said $R_1$ and $R_2$.

The following examples are intended to illustrate, but not to limit the scope of the present invention.

Example I

To an ethereal solution of ethyl magnesium bromide prepared from 4.86 g. (0.2 g. atom) of magnesium and 25 g. (0.229 mole) of ethyl bromide is added 125 ml. of dry benzene. Ether is distilled until the boiling point of the mixture reaches 60–63° C. Then 13.2 g. (0.2 mole) of freshly distilled cyclopentadiene is added and the mixture is refluxed for six hours. The resultant cyclopentadienyl magnesium bromide solution is cooled under an atmosphere of dry nitrogen to below 0° C. and 36.4 g. (0.2 mole) of benzophenone in 100 ml. of ether is added with stirring. After stirring for an additional 30 min., the mixture is hydrolyzed with excess ice water containing 12.0 g. (0.2 mole) of glacial acetic acid. The organic base is separated and the aqueous phase extracted with three 150–200 ml. portions of ether. The combined extracts are washed with dilute sodium bicarbonate solution and dried over sodium sulfate. Most of the solvent is evaporated in vacuo and the resultant semi-crystalline mass crystallizes upon addition of hexane. The solid is filtered, washed with pet ether, and dried to yield α-cyclopentadienyl-α-phenylbenzyl alcohol; M.P. 119–123° C.

Example II

To 100 ml. of absolute ethanol is added 12.4 g. (0.05 mole) of α-cyclopentadienyl-α-phenylbenzyl alcohol and 9.2 g. (0.05 mole) of di-2-pyridyl ketone. The resulting solution is cooled to —5° C. and 20 ml. of absolute ethanol containing 0.115 g. (0.005 g. atom) of dissolved sodium is added. After stirring for about two hours, the crystalline product (isomeric mixture) is filtered, washed with ethanol, washed with acetone and then dried; M.P. 142–149° C. From nuclear magnetic resonance (n.m.r.) spectroscopy, the product is found to be predominantly composed of 1 - (diphenyl-hydroxymethyl) - 4-(di-2-pyridyl-hydroxymethyl) - cyclopenta - 1,3-diene and 1-(diphenyl-hydroxymethyl) - 3 - (di-2-pyridyl-hydroxymethyl)-cyclopenta-1,3-diene.

Example III

To 100 ml. of absolute ethanol is added 12.4 g. (0.05 mole) of α-cyclopentadienyl-α-phenylbenzyl alcohol and 9.2 g. (0.05 mole) of 2-pyridyl-4-pyridyl ketone. The resulting solution is cooled to −5° C. and 20 ml. of absolute ethanol containing 0.115 g. (0.005 g. atom) of dissolved sodium is added. Stirring at the above temperature for 2–3 hours gives the product as a mixture of isomers consisting mainly of 1 - (diphenyl - hydroxymethyl) - 4-[(2-pyridyl-4-pyridyl)-hydroxymethyl]-cyclopenta - 1,3-diene and 1-(diphenyl-hydroxymethyl)-3-[(2-pyridyl - 4 - pyridyl) - hydroxymethyl)]-cyclopenta-1,3-diene,

Example IV

The 100 ml. of absolute ethanol is added 12.4 g. (0.05 mole) of α-cyclopentadienyl-α-phenylbenzyl alcohol and 10.6 g. (0.05 mole) of 6,6′-dimethyl-di-2-pyridyl ketone. The resulting solution is cooled to −5° C. and 20 ml. of absolute ethanol containing 0.115 g. (0.005 g. atom) of dissolved sodium is added. Stirring at this temperature for about two hours gives the product as a mixture of isomers consisting mainly of 1-(diphenyl-hydroxymethyl)-4-[di-(6 - methyl - 2-pyridyl)-hydroxymethyl]-cyclopenta-1,3-diene and 1-(diphenyl-hydroxymethyl)-3-[di-(6-methyl-2-pyridyl)-hydroxymethyl]-cyclopenta-1,3-diene.

What is claimed is:

1. $R_1$—$R_2$-hydroxymethyl substituted cyclopentadiene having an $R_3$—$R_4$-hydroxymethyl substituent on a ring carbon atom one removed from the ring carbon atom bearing said $R_1$—$R_2$-hydroxymethyl substituent wherein $R_1$ and $R_2$ are each phenyl; $R_3$ and $R_4$ are each a member selected from the group consisting of phenyl, pyridyl and lower alkyl-pyridyl, said pyridyl being 2-pyridyl or 4-pyridyl.

2. The compound of claim 1 wherein $R_1$ and $R_2$ are each phenyl, and $R_3$ and $R_4$ are each 2-pyridyl.

3. The compound of claim 1 wherein $R_1$ and $R_2$ are each phenyl, $R_3$ is 2-pyridyl and $R_4$ is 4-pyridyl.

4. The compound of claim 1 wherein $R_1$ and $R_2$ are each phenyl, and $R_3$ and $R_4$ are each 6-methyl-2-pyridyl.

References Cited

FOREIGN PATENTS 660,853  9/1965  Belgium.

HENRY R. JILES, *Primary Examiner.*

A. L. ROTMAN, *Assistant Examiner.*

U.S. Cl. X.R.

260—618, 297, 45.8